INVENTORS
ROLLIN A. ARMER
HARRY H. HECKMAN, JR.
ATTORNEY

May 30, 1967

R. A. ARMER ETAL 3,323,133

OPERATIONS TIMING DEVICE

Filed Sept. 7, 1965

INVENTORS
ROLLIN A. ARMER
BY HARRY H. HECKMAN, JR.

ATTORNEY 3,323,133
OPERATIONS TIMING DEVICE
Rollin A. Armer and Harry H. Heckman, Jr., Berkeley, Calif., assignors to the United States of America as represented by the United States Atomic Energy Commission
Filed Sept. 7, 1965, Ser. No. 485,644
2 Claims. (Cl. 346—107)

ABSTRACT OF THE DISCLOSURE

This invention is a compact, accurate, and self-contained timing device for programming a series of operations over an extended time period. A clock pulse generator periodically advances a coded tape past a detector by means of an escapement type drive. Signals from the tape then advance a second escapement drive which, through a plurality of coded cams, cause various desired functions to be performed.

Figure 1:
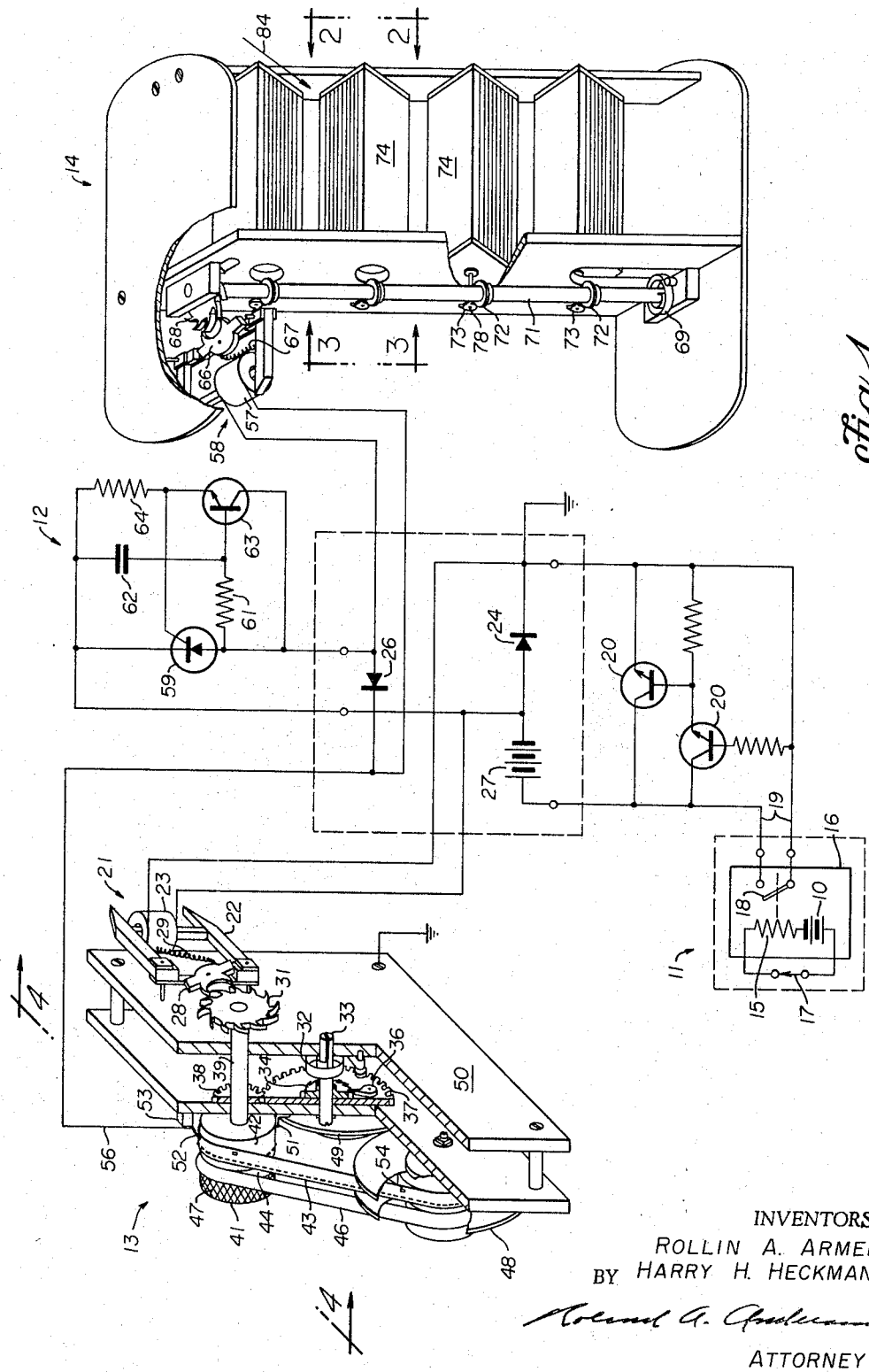

The present invention relates to timing devices and more particularly to a compact device having self contained means for very accurately programming a series of operations over a long period which may typically be of the order of several days. The invention described herein was made in the course of, or under, Contract W–7405–eng–48 with the Atomic Energy Commission.

In connection with space flight activities it has been found necessary to obtain a record of high-energy particle and cosmic ray activity in certain regions such as sections of the Van Allen radiation belt. This can be done by means of film packs carried on an orbiting satellite. Radiations of this type will expose the film upon passing therethrough and thus a visible track of the radiation is obtained by developing the film.

Complications are present in adapting the film emulsion technique to the detection of radiation in space. For example, a space vehicle after launching may make several orbits prior to passing through the particular portion of the Van Allen belt in which radiation data is to be obtained. Some hours later the capsule may again pass through the specified area and then again at the end of further intervals of time. In order to minimize unwanted exposure of the film the film packs must be turned broadside to ambient radiation except during the one passage through the zone of interest when a film is to be exposed. This requires a film manipulating means together with a very accurate timing device in control of such means. The present invention provides a very compact and light weight device for accomplishing these operations on an orbiting satellite and may also be adapted for other purposes in which a very compact device is required for effecting accurately timed operations over a long time period.

In a typical embodiment of the invention, four film packs with all the equipment required to make the desired exposures and then turn the film packs to their exposed positions in sequence, together with the timing equipment required to cause the events to occur at the desired time, are all contained in a small package measuring about two and three-fourths inches by five and three-fourths inches by six and one-half inches. This package has no external connections and utilizes an inertial switch to start the equipment at take off of the rocket bearing the space capsule aloft.

A chronometer started by the inertial switch provides the basic timing means and produces a first signal at relatively frequent intervals, every thirty minutes for example. This signal operates a first impulse motor which advances a programming device one step per impulse. The programming device produces a second signal which initiates operation of a second impulse motor at the time the exposure of the first film pack should start. The second impulse motor drives a shaft which turns the film packs, in precisely timed succession, to the position for exposure and then to the exposed position.

Accordingly, it is an object of this invention to provide a compact, self contained mechanism for accurately timing and initiating a series of operations which are to occur over a long period of time.

It is an object of this invention to provide a compact rugged operations timing mechanism particularly suited for use in space vehicles.

Another object of this invention is to provide means for accurately exposing of a plurality of radiation detecting film packs carried in a space vehicle in accordance with a predetermined time schedule.

A further object of the present invention is to provide a self-controlled mechanism for very accurately timing a series of operations which may be spaced over a period of several days time.

A still further object of this invention is to provide a small self contained programming device that may be carried in a space vehicle for initiating particular operations at predetermined regions of the trajectory traversed by the space vehicle.

Figure 2:
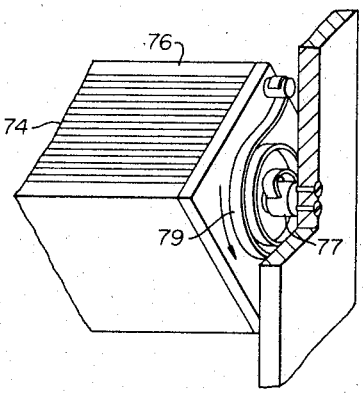
Figure 3:
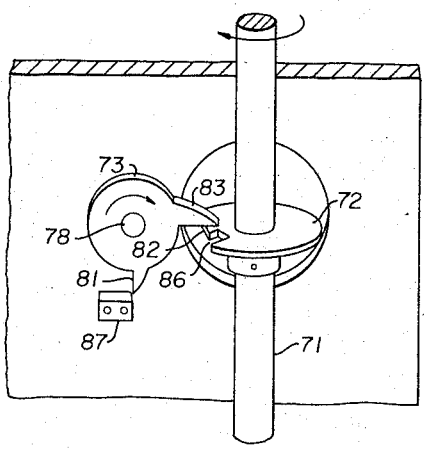
Figure 4:
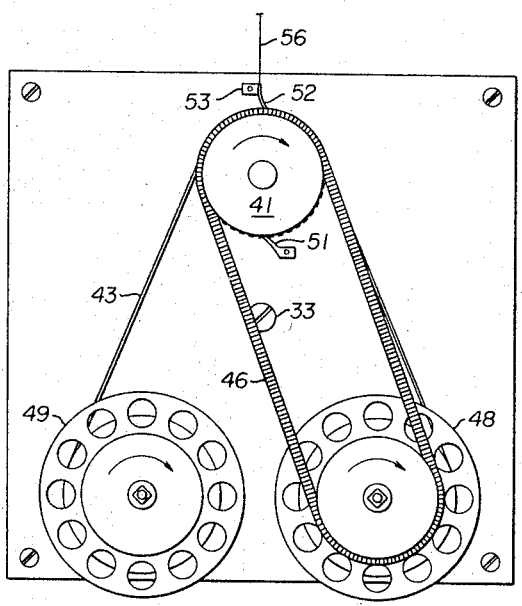

The invention together with further objects and advantages thereof will be best understood by reference to the following specifications in conjunction with the accompanying drawing of which:

FIGURE 1 is a broken-out perspective view of operating elements of the invention with electronic circuitry shown schematically, FIGURE 2 is a broken-out enlarged perspective view of a portion of the apparatus of FIGURE 1 taken along line 2—2 thereof, FIGURE 3 is a broken-out perspective view taken along line 3—3 of FIGURE 1 and showing additional detail of the mechanism in enlarged form, and FIGURE 4 is a side view of the time programming portion of the timing device of FIGURE 1 taken along line 4—4 thereof.

Referring now to the drawing and particularly to FIGURE 1 the timing device of the invention consists of four major components which are a basic time measuring unit 11 arranged to provide a regular periodic time signal, an electronic amplifier and switching circuit 12, a time programmer 13 controlled by the regular time signal and generating a series of secondary signals at programmed times and an operating unit 14 to translate the program into the desired operations, in this instance into the desired exposure of film packs to radiation in the Van Allen belt.

Time measuring unit 11 has a conventional electrical watch movement 16 having its own internal resistance 15 and battery 10. An inertial switch 17 mounted external to the case of the watch movement 16 is connected in series with the internal resistance 15 and battery 10 of the movement. Closure of the inertia switch 17, upon the take-off of the launching rocket, starts watch movement 16 which in turn closes a contact 18 once every thirty minutes. An impulse motor 21 which is a part of the time programmer 13 has a magnetic armature 22 with a coil 23 which is connected to a battery 27 through the amplifying and switching circuit 12 and which is energized by a sharp electrical pulse generated by an amplifier comprised of transistors 20 when the two amplifier leads 19 are connected together by the closing of contact 18 in the watch mechanism. A diode 24 protects the amplifier circuit from the discharge of coil 23 when the contact 18 is opened.

Energizing of the coil 23 in the above described manner pulls up an escapement mechanism 28, in the programming unit 13, against the tension of a spring 29. At the end of the pulse the spring 29 pulls the escapement mechanism 28 back to its original position. The entire action of pull up and return of the escapement mechanism 28 allows the escapement wheel 31 to advance one point by means of the force provided by a second spring 32 through a shaft 33, a ratchet wheel 34 secure to shaft 33, a ratchet 36, a gear 37 carrying ratchet 36, and a gear 38 secured to the same shaft 39 as the escapement wheel 31. The escapement wheel 31 therefore advances one point every thirty minutes and in this embodiment a total of twelve points on the escapement wheel provides for one turn of shaft 39 in six hours.

A sprocket 41 of electrically conductive material mounted on shaft 39, on the end thereof remote from escapement wheel 31, is comprised of a portion 42 for carrying a program belt 43 of insulating material, a grooved section 44 for carrying a round spring type belt 46 and an outer knurled section 47. As best shown in FIGURE 4, the program belt 43 is taken up on a spool 48 which is driven by belt 46 to keep the belt 43 snug. Belt 43 is paid out by a braked spool 49. Belt 43 is coded for the desired operations by a series of holes 54 which are sensed by means to be hereinafter described.

Referring again to FIGURE 1 a spring contact 51 electrically grounds sprocket 41 to the frame 50 of the programmer 13. Another spring contact 52, held by a mounting insulator 53 which is secured to the frame 50 of programmer 13, is disposed in position to contact sprocket 41 when a programming hole 54 reaches the proper position as a result of the turning of the sprocket. An electrical lead 56 connects the contact 52 to the activating coil 57 of a second impulse motor 58 which may be of the same construction as the impulse motor 21. The circuit through the coil 57 is completed through a silicon controlled-rectifier 59 to the battery 27. Current flow through the rectifier 59 and hence through the coil 57 is controlled by a time delay circuit composed of resistor 61 and capacitor 62 which together with transistor 63 and resistor 64 delays the operation of impulse motor 58. This precludes the operation of motor 58 when a pulse is initiated by time measuring unit 11 while the contact 52 rests near the trailing end of one of the holes 54 as a result of the previous operation of impulse motor 21 in which situation this motor will step the belt 43 to the next position before motor 38 will operate and thus prevent two operations of the motor 58 for one hole in the belt. The hole 54 in belt 43 usually is about the length of one step of the belt and is spaced to start under the contact 52 at the very inception of belt movement. The leading edge of a hole 54 may come under the contact 52 during the final movement of belt 43 during the step preceding the desired pulse to motor 58. Since this final movement is made during that portion of the action of escapement wheel 31 after the activating pulse has terminated, contact 18 has opened and escapement mechanism 28 is returned to normal position under the force of spring 29. Because of this action of escapement wheel 31 the motion of belt 43 is divided into two parts, the first sixty-five percent taking place during the power pulse to motor 21, during which the escapement mechanism 31 is pulled up against the tension of spring 29 and the remaining thirty-five percent occurring during the return of the escapement mechanism under the tension of the spring. In the activation of impulse motor 21 the contact 18 remains closed long enough for the impulse motor to be activated. A diode 26 connected across the terminals of the coil 57 protects the circuitry from the discharge of the coil when the circuit to the coil is opened.

An electrical pulse through the coil 57 pulls up a second escapement 66 against the tension of a spring 67 and following the pulse the spring returns the escapement to normal position. These two steps advance the escapement wheel 68 one point under the force of a spring 69 which drives the shaft 71 on which the escapement wheel is mounted. The escapement wheel 68 has twelve points so that shaft 71 advances through an angle of thirty degrees for each complete operation of the stepping motor 58. Four discs 72, each having cut-out areas to operate one of four associated cams 73, are mounted on the shaft 71. The cams 73 are each mounted on a separate axle 78 controlling the rotary motion of a separate one of four film packs 74.

Referring to FIGURES 2 and 3, the film pack 74, loaded in a rectangular container 76, is mounted in the frame of operating unit 14 by means of two short axles 77 and 78. The axle 77 is stationary and the container 76 turns thereon and tends to rotate in the direction determined by a spiral spring 79. In the original load position the film pack container 76 is held from turning by a short ear 81 of cam 73 resting on an unnotched portion of the disc 72. Each of the container 76 and the associated controlling cam 73 is initially placed in this position. When the correct time arrives to expose the first pack the stepping magnet 58 advances the shaft 71 and the discs 72 so that a notch 82 in the first disc 72 allows the associated cam 73 to turn by the passage of the ear 81 therethrough. The motion of cam 73 is stopped by a long ear 83 therein after turning 90 degrees thereby placing the film in position for exposure, i.e., parallel to the direction of ambient radiation as indicated by arrow 84 in FIGURE 1. After the time for exposure of film pack 74 has passed, the motor 58 is again activated by another hole 54 in belt 43 which causes the shaft 71 to turn by one more point on escapement wheel 68. Referring again to FIGURE 3, this turns the disc 72 so that the deeper notch 86 permits the long ear 83 of cam 73 to turn therethrough until it strikes a stop 87. This permits shaft 78 and film pack 74 to turn through another 90 degree angle and thus complete its cycle by returning to the position where radiation 84 goes through the film at right angles to its surface leaving only a pin point of exposure.

When the space vehicle is in position to again enter the section of the Van Allen belt to be checked, the second film pack 74 will be turned to the exposure position by the shallow notch 82 of the second disc 72 moving under the short ear 81 of the second cam 73. After exposure of the second film pack 74 it will turn to the exposed position by the turning of shaft 71 one additional position. This cycle will be repeated for the remaining two film packs 74 by programming determined by holes 54 in the belt 43 at the proper predetermined locations.

After the last film pack 74 has been turned to the exposed position the belt will continue to advance at 30 minute intervals. However, since no more holes are present in belt 43 the motor 58 will not be activated further. The belt 43 continues to advance until the end of the belt which is anchored to spool 49, see FIGURE 4, precludes further movement. The motor 21 will continue to be activated until the battery 27 is discharged or until the device is retrieved.

Although the invention has been disclosed with respect to a single exemplary embodiment it will be evident to those skilled in the art that many variations are possible within the spirit and scope of the invention. Therefore, it is not intended to limit the invention except as defined by the following claims.

What is claimed is:

1. Apparatus for accurately timing a plurality of operations over a long time period comprising, in combination, a watch movement having means to produce a series of first electrical signals at regular successive intervals, an escapement mechanism having electrical drive means periodically activated by said first signals, a precoded programming device operated by said escapement mechanism and having means for producing a second signal series at times which are predetermined by the coding of said programming device, a second escapement mechanism actuated by said second signals, and a shaft turned by said second escapement in response to each of said second signals for initiating said plurality of operations at the programmed times, a plurality of disc shaped elements secured to said shaft, each of said discs having a notch in the rim thereof, and a plurality of spring loaded detents each bearing against one of said discs whereby said detents operate upon turning of the notch of the associated disc into register therewith, each of said detents serving to initiate one of said plurality of operations.

2. Apparatus as described in claim 1, particularly adapted to expose a series of photographic film emulsions to ambient radiation comprising the further combination of a plurality of rotatable film mounting members each carrying one of said film emulsions and each being coupled to a separate one of said detents, said mounting members being initially aligned to hold said film transverse to said ambient radiation and turning said film substantially parallel to said radiation upon release of the associated detent.

References Cited
UNITED STATES PATENTS

| | | | |
|---|---|---|---|
| 3,096,507 | 7/1963 | Harms et al. | 340—309.1 |
| 3,102,997 | 9/1963 | Dirks | 235—61.6 |
| 3,158,853 | 11/1964 | Coben | 340—309.4 |

RICHARD B. WILKINSON, *Primary Examiner.*

M. L. LORCH, *Assistant Examiner.*